United States Patent [19]
Benedek et al.

[11] 4,373,409
[45] Feb. 15, 1983

[54] COMBINATION CREEPER GEAR AND CONTROL SYSTEM FOR A TRANSMISSION

[75] Inventors: Vasile Benedek, Bruhl; Volker D. Hückler, Mannheim, both of Fed. Rep. of Germany

[73] Assignee: Deere & Company, Moline, Ill.

[21] Appl. No.: 172,616

[22] Filed: Jul. 28, 1980

[30] Foreign Application Priority Data

Jul. 31, 1979 [DE] Fed. Rep. of Germany ....... 2930950

[51] Int. Cl.³ ............................................. F16H 3/02
[52] U.S. Cl. ..................................... 74/745; 74/329; 74/339; 74/483 K
[58] Field of Search ............ 74/745, 329, 339, 483 R, 74/483 K, 333; 192/53 F

[56] References Cited

U.S. PATENT DOCUMENTS

| | | |
|---|---|---|
| 2,201,169 | 5/1940 | Griswold . |
| 2,206,409 | 7/1940 | Kummich . |
| 2,221,900 | 11/1940 | White et al. . |
| 2,835,143 | 5/1958 | Kelbel ................ 74/745 X |
| 2,892,358 | 6/1959 | Backus et al. ......... 74/745 X |
| 2,953,943 | 9/1960 | Arnold ............... 74/745 |
| 3,301,078 | 1/1967 | Michael .............. 74/333 |
| 3,645,147 | 2/1972 | Fodrea ............... 74/745 X |
| 4,318,305 | 3/1982 | Wetrich et al. ........ 74/339 |

FOREIGN PATENT DOCUMENTS

548331 6/1956 Belgium .

*Primary Examiner*—George H. Krizmanich

[57] ABSTRACT

A combination creeper gear and control system for a transmission is disclosed having a range selector gear followed by a change speed gear. The combination includes an engine-driven drive shaft connected through a creeper gear mechanism to an input shaft which extends into the transmission. The creeper mechanism includes a drive gear mounted on the drive shaft, a driven gear mounted on the input shaft and a lay shaft aligned parallel to both the drive shaft and the input shaft. The lay shaft supports a compound gear which includes a first and a second gear, wherein the first gear meshes with the drive gear and the second gear meshes with the driven gear. The combination further includes a synchronizer located between the drive gear and driven gear which is selectively engageable between a direct mode and a creep mode. In the direct mode, the drive shaft is directly connected to the input shaft, while in the creep mode, the drive shaft is connected to the input shaft by way of the compound gear. The creeper mechanism is activated by a selector control which consists of a first and a second shift rod and a locking pin movably positioned between the two shift rods. The first shift rod is associated with the creeper gear mechanism while the second shift rod is associated with the range selector gear. The locking pin controls the movement of the first and second shift rods such that the creep mode cannot be selected when the range selector gear is in a high speed range, but which can be selected in either a forward or reverse low-speed range.

10 Claims, 2 Drawing Figures

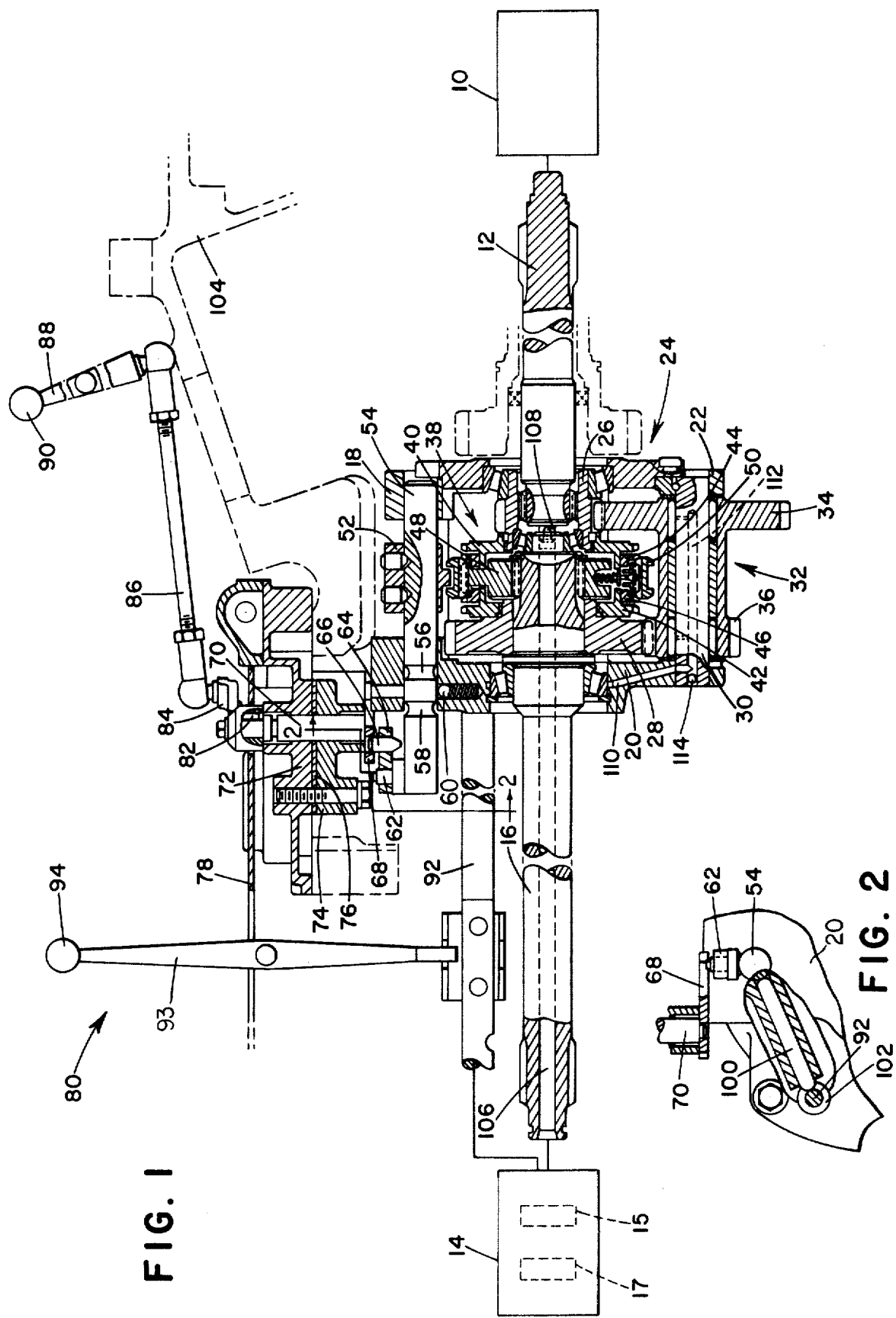

COMBINATION CREEPER GEAR AND CONTROL SYSTEM FOR A TRANSMISSION

BACKGROUND OF THE INVENTION

1. Field of the Invention

This invention relates to a combination creeper gear and control system for a transmission and more particularly to a combination creeper gear and control system which is capable of providing extra low creep speeds.

2. Description of the Prior Art

Currently some agricultural tractors employ a transmission which has a creeper gear interposed between a range selector gear and a change speed gear. This creeper gear is positioned on a lay shaft adjacent to the transmission gear arrangement. In such an arrangement, the speed of the input shaft of the transmission, with respect to the creeper gear, is always reduced by the range selector gear and therefore it is difficult to provide the creeper gear as an optional feature on the tractor. Thus, when the creeper gear is disposed downstream of the range selector gear, the drive gear wheel of the creeper gear must be arranged coaxially with respect to the output shaft of the range selector gear so that it also rotates at the reduced speed. Creeper gears of this kind are not synchronized but can be shifted by way of a dog or a sliding gear shift mechanism. If creeper gears of this kind are to be synchronized, the relatively low speed of rotation would result in relatively high torque values, which in turn would have the result that the synchronization means would have to be of heavy duty construction.

These disadvantages are overcome by the present invention wherein a combination creeper gear and control system for a transmission is taught with a creeper gear mechanism positioned upstream and independent of the transmission.

The general object of this invention is to provide a combination creeper gear and control system for a transmission. A more specific object of the invention is to provide a combination creeper gear and control system for a transmission wherein extra low creep speeds are obtainable.

Another object of this invention is to provide a combination creeper gear and control system for a transmission having a range selector gear followed by a change speed gear wherein the creeper gear is upstream and independent of both the range selector gear and the change speed gear.

Still another object of this invention is to provide a combination creeper gear and control system for a transmission which is synchronized.

Other objects and advantages of the present invention will be more apparent from the following description and the drawings.

SUMMARY OF THE INVENTION

Briefly, the present invention relates to a combination creeper gear and control system for use on vehicles, such as agricultural tractors, having a transmission with a range selector gear followed by a change speed gear. This combination of creeper gear and control system is comprised of an engine driven drive shaft, an input shaft extending into the transmission, a creeper gear mechanism, a synchronizer and a selector control means. The creeper gear mechanism which is positioned between the drive shaft and the input shaft includes a drive gear mounted on the drive shaft, a driven gear mounted on the input shaft and a lay shaft aligned parallel to both the drive shaft and the input shaft. Mounted on the lay shaft is a compound gear made up of a first gear and a second gear. The first gear meshes with the drive gear and the second gear meshes with the driven gear. Located between the drive gear and the driven gear is a synchronizer. This synchronizer is selectively engageable between a direct mode wherein the drive shaft is directly connected to the input shaft and a creep mode wherein the drive shaft is connected to the input shaft by way of the lay shaft and the compound gear.

In order to actuate the synchronizer, a selector control means is provided for selecting between the direct mode and the creep mode. This selector control means includes a lever actuated first shift rod associated with the creeper gear mechanism, a lever actuated second shift rod associated with the range selector gear and a locking pin slideably positioned between the first and second shift rods. This locking pin is controlled by the movement of the two shift rods such that the creep mode cannot be selected when the range selector gear selects a higher speed range but which can be selected in either a low speed forward range or a reverse range of the range selector gear.

Such a combination creeper gear and control system is an improvement over the prior art in that it provides an independent means for providing a direct drive between the drive shaft and the input shaft as well as providing a synchronized creeper gear speed.

BRIEF DESCRIPTION OF THE DRAWINGS

FIG. 1 is a cross-sectional view of the combination creeper gear and control system.

FIG. 2 is a partial sectional view of the locking pin and the first and second shift rods.

DETAILED DESCRIPTION OF THE INVENTION

Referring to FIG. 1, an internal combustion engine 10 having a drive shaft 12 is connected to a transmission 14. The transmission 14 has an input shaft 16 which is associated with a range selector gear 15 followed by a change speed gear 17. Located between the drive shaft 12 and the input shaft 16 is a housing 18 having end walls 20 and 22. The housing 18 forms an enclosure for a creeper gear mechanism 24. This creeper gear mechanism 24 includes a drive gear 26 splined to the drive shaft 12 and a driven gear 28 rotatably attached to the input shaft 16. The creeper gear mechanism 24 also includes a lay shaft 30 which has a compound gear 32 mounted thereon. The compound gear 32 is made up of a first gear 34 which meshes with the drive gear 26 and a second gear 36 which meshes with the driven gear 28. Preferably the first gear 34 is larger than the second gear 36.

Positioned between the drive gear 26 and the driven gear 28 is a synchronizer 38 of a commonly known type. The synchronizer 38 includes synchronization wheels 40 and 42 which are associated with the drive gear 26 and the driven gear 28, respectively, and which in turn cooperate with synchronization rings 44 and 46. Provided between the synchronization wheels 40 and 42 and the synchronization rings 44 and 46 is a synchronization member 48 into which engages a displaceable sleeve 50. This displaceable sleeve 50 is movable in the axial direction by way of a shift fork 52.

When the shift fork 52 is moved to the right of the position shown in FIG. 1, the line of drive passes from the drive shaft 12 to the input shaft 16 by way of the drive gear 26, the synchronization wheel 40, the synchronization ring 44 and the synchronization member 48. In this particular case, the transmission input shaft 16 is driven directly by the drive shaft 12.

When the shift fork 52 is moved to the left of the position shown in FIG. 1, the driven gear 28 comes into engagement with the synchronization member 48 so that the line of drive passes from the drive shaft 12 to the input shaft 16 by way of the drive gear 26, the compound gear 32 and the driven gear 28. In this case, the input shaft 16 is driven at a reduced speed in comparison with the drive shaft 12.

The shift fork 52 which actuates the displaceable sleeve 50 is clamped to a first shift rod 54. This first shift rod 54 is axially displaced in bores in the end walls 20 and 22 of the housing 18. The first shift rod 54 also contains two grooves 56 and 58 into which a spring-loaded ball 60 is engageable. The two grooves 56 and 58 provide detent action so that when the groove 58 is engaged by the spring-loaded ball 60, a 1:1 speed ratio is transmitted from the drive shaft 12 to the input shaft 16. When the groove 56 is engaged by the spring-loaded ball 60, a reduced speed ratio is imparted from the drive shaft 12 through the compound gear 32 to the input shaft 16.

A pin 62 projects outward from the first shift rod 54 and engages with a link 64 which is located outside of the housing 18. A second pin 66, which is fitted into a horizontal leg 68 which projects outward from a shift shaft 70, also engages in the link 64.

The shift shaft 70 extends vertically upward so that it is arranged perpendicularly to the horizontal leg 68. The upper end of the shift shaft 70 passes through a control valve housing 72, a distributor 74 and an oil guide plate 76. The shift shaft 70 extends upward through a platform 78 of a driving station 80 and is fixed by way of a key 82 to a first actuating lever 84. This first actuating lever 84 is in turn joined by a connecting rod 86 to a first shift lever 88. The first shift lever 88 is topped off by a shift knob 90. By actuating the first shift lever 88, the connecting rod 86 is moved axially which in turn causes the first actuating lever 84 to rotationally move the shift shaft 70. As the shift shaft 70 is rotated about its axis, the horizontal leg 68 and the link 64 are so moved that the first shift rod 54 is axially moved into either of its two positions. A second shift rod 92, which is parallelly aligned with the first shift rod 54 (see FIG. 2), is also arranged in the housing 18. This second shift rod 92 is axially movable by actuation of a second shift lever 93. The second shift lever 93 is topped off by a shift knob 94. Pushing or pulling the second shift lever 93 causes axial movement of the second shift rod 92.

The combination creeper gear and control system is so designed that the creep mode can be engaged only when the range selector gear 15 of the transmission 14 is engaged in a low speed forward range or a reverse range. In other words, when the range selector gear 15 is in a high forward speed range, the creep mode cannot be entered.

Referring now to FIG. 2, the manner in which the locking action is effected is shown in detail. The shift shaft 70 with its horizontal leg 68 is shown connected by way of the pin 62 to the first shift rod 54. A locking pin 100 is engageable into respective grooves in the first and second shift rods 54 and 92, respectively. Only one groove 102 is depicted for the second shift rod 92, although other grooves are present. The length of the locking pin 100 corresponds to the distance between the first and the second shift rods 54 and 92, respectively, plus the depth of one of the grooves. This ensures that a shift rod can only be moved if the locking pin 100 is engaged in the respective groove in the other shift rod. The ends of the locking pin 100 are hemispherically shaped and thus move axially by the radial forces which result out of the axial movement of the first and second shift rods, 54 and 92 respectively. It is only when the locking pin 100 is engaged in the groove 102 that the first shift rod 54 can be moved in such a way that the spring-loaded ball 60 can engage into the groove 56, i.e., for selection of a reduced speed. As the locking pin 100, due to its overall length, always projects into either an annular groove of the second shift rod 92 or into an annular groove of the first shift rod 54, it is only possible to move the shift rod which is not blocked by the locking pin 100. This means that the second shift rod 92, which controls the range selector gear 15, can only be shifted when the first shift rod 54, which controls the change speed gear 17, is in a position in which it takes up the locking pin 100. Or vice versa, the first shift rod 54 can only be moved when the locking pin 100 projects into an annular groove on the second shift rod 92 when the second shift rod 92 is in the position to select the low forward or the reverse range.

More particularly, when the pin 100 is engaged in the groove 102, the second shift rod 92 will be moved to the left such that the low forward speed range is engaged. This engagement can be done by a second pin, similar to pin 100, which cooperates with a third shaft which controls the high speed range. Those skilled in the art will be versed in the different methods of connecting the shift rods to the various gear mechanisms.

Returning again to FIG. 1, a clutch housing 104 is shown having a first lubrication bore 106 located in the input shaft 16. A nipple 108 is fitted into the end of the bore 106 for sealing purposes. This bore 106 provides an oil passageway to the interior region of the creeper gear mechanism 24. Also shown are second and third lubrication oil bores 110 and 112, respectively, for providing oil passageways to the compound gear 32. The second oil bore 110 is formed in the end wall 20 and the third oil bore 112 is formed within the lay shaft 30. An oil plug 114 is present which closes off one end of the lay shaft 30.

The combination creeper gear and control system of this invention is of such a design in respect to its dimensions that it can replace a preliminary gear unit which is provided in some agricultural tractor transmissions. This enables the vehicle user to either order a transmission in which all of the gears can be doubled or to order a transmission in which only the lowest forward gear range and the reverse range can be doubled in respect to its number of gears.

While the invention has been described in conjunction with a specific embodiment, it is to be understood that many alternatives, modifications and variations will be apparent to those skilled in the art in light of the aforegoing description. Accordingly, it is intended to embrace all such alternatives, modifications and variations which fall within the spirit and scope of the appended claims.

We claim:

1. A combination creeper gear and control system for a transmission having a range selector gear followed by a change speed gear, said combination comprising:
(a) an engine driven drive shaft;
(b) an input shaft extending into said transmission;
(c) a creeper gear mechanism comprising a drive gear mounted on said drive shaft, a driven gear mounted on said input shaft and a lay shaft aligned parallel to both said drive shaft and said input shaft having a compound gear mounted thereon, said compound gear having a first and a second gear, said first gear meshing with said drive gear and said second gear meshing with said driven gear;
(d) a synchronizer located between said drive gear and said driven gear, said synchronizer being selectively engageable between a direct mode wherein said drive shaft is directly connected to said input shaft and a creep mode wherein said drive shaft is connected to said input shaft by way of said lay shaft and said compound gear; and
(e) selector control means for activating said synchronizer between said direct mode and said creep mode, said selector control means including a first lever-actuated shift rod associated with said creeper gear mechanism, a second lever-actuated shift rod associated with said range selector gear, and a locking pin slideably positioned between said first and second shift rods, said locking pin being controlled by movement of said first and second shift rods such that said creep mode cannot be selected when said range selector gear selects a higher speed range but which can be selected in either a low speed forward range or a reverse range of said range selector gear.

2. The combination of claim 1 wherein said drive gear is non-rotatably attached to said drive shaft.

3. The combination of claim 1 wherein said driven gear is freely rotatable on said input shaft in said direct mode.

4. The combination of claim 1 wherein said drive shaft is coaxially aligned with said input shaft.

5. The combination of claim 4 wherein said drive shaft is coaxially aligned with said synchronizer.

6. The combination of claim 1 wherein said input shaft contains an axial bore through which lubricating oil is directed to said synchronizer.

7. A combination creeper gear and control system for a transmission having a range selector gear followed by a change speed gear, said combination comprising:
(a) an engine driven drive shaft;
(b) an input shaft extending into said transmission and connected to said range selector gear, said input shaft being coaxially aligned to said drive shaft;
(c) a creeper gear mechanism comprising a drive gear non-rotatably mounted on said drive shaft, a driven gear mounted on said input shaft, and a lay shaft aligned parallel to both said drive shaft and said input shaft having a compound gear mounted thereon, said compound gear having a first and a second gear, said first gear meshable with said drive gear and said second gear meshable with said driven gear;
(d) a synchronizer coaxially aligned between said drive gear and said driven gear, said synchronizer being selectively engageable between a direct mode wherein said driven shaft is directly connected to said input shaft and a creep mode wherein said drive shaft is connected to said input shaft by way of said lay shaft and said compound gear;
(e) selector control means for activating said synchronizer between said direct mode and said creep mode, said selector control means including a first lever-actuated shift rod associated with said creeper gear, a second lever-actuated shift rod associated with said range selector gear, and a locking pin traversely positioned between said first and second shift rods, said locking pin being controlled by movement of said first and second shift rods such that said creep mode cannot be selected when said range selector gear selects a higher speed range but which can be selected in either a low speed forward range or a reverse range of said range selector gear.

8. The combination of claim 7 wherein said selector control means comprises:
(a) an axially movable first shift rod containing two concentric grooves;
(b) a movable pin transversely aligned to said first shift rod;
(c) a rotatable shift shaft aligned parallel to the axis of said movable pin;
(d) an actuating lever movably connected to one end of said shift shaft;
(e) a connecting rod attached to the opposite end of said actuating lever; and
(f) a movable lever arm joined to said connecting rod for rotatably actuating said shift shaft and thereby axially moving said first shift rod.

9. A combination creeper gear and control system for a transmission having a range selector gear followed by a change speed gear, said combination comprising a creeper gear mechanism situated upstream and independent of both said range selector gear and said change speed gear, said creeper gear mechanism being capable of continuously driving said transmission at engine speed.

10. A combination creeper gear and control system for a transmission having a range selector gear followed by a change speed gear, said combination comprising:
(a) an engine driven drive shaft;
(b) an input shaft extending into said transmission;
(c) a creeper gear mechanism including a drive gear mounted on said drive shaft, a driven gear mounted on said input shaft, and a lay shaft aligned parallel to both said drive shaft and said input shaft having a compound gear mounted thereon, said compound gear having a first and a second gear, said first gear meshing with said drive gear and said second gear meshing with said driven gear;
(d) a synchronizer located between said drive gear and said driven gear, said synchronizer being selectively engageable between a direct mode wherein said drive shaft is directly connected to said input shaft and a creep mode wherein said drive shaft is connected to said input shaft by way of said lay shaft and said compound gear; and
(e) selector control means for activating said synchronizer between said direct mode and said creep mode, said selector control means including a first lever-actuated shift rod associated with said creeper gear mechanism which contains two axially spaced concentric grooves, a second lever-actuated shift rod associated with said range selector gear which contains at least two axially spaced concentric grooves, and a locking pin perpendicularly positioned between said first and second shift rods, said locking pin having an overall length equal to the distance between said first and second shift rods plus the depth of one of said concentric grooves such that said locking pin is slideably controlled by axial movement of said first and second shift rods to permit said creep mode to be selected when said range selector gear is in either a low speed forward range or a reverse range but not when said range selector gear is in a higher speed range.

* * * * *